Figure 1:
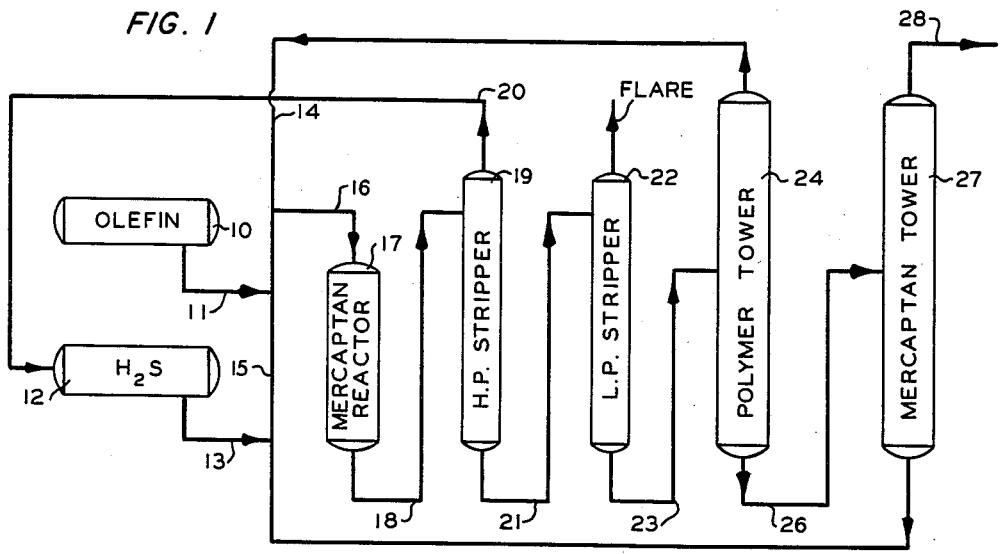

March 26, 1963  C. A. RAY, JR  3,083,231
PRODUCTION OF MERCAPTANS
Filed July 1, 1960

INVENTOR.
C.A. RAY, JR.
BY Hudson & Young
ATTORNEYS

United States Patent Office 3,083,231
Patented Mar. 26, 1963

3,083,231
PRODUCTION OF MERCAPTANS
Charles A. Ray, Jr., Phillips, Tex., assignor to Phillips Petroleum Company, a corporation of Delaware
Filed July 1, 1960, Ser. No. 40,432
5 Claims. (Cl. 260—609)

This invention relates to the production of mercaptans through the interaction of hydrogen sulfide and selected olefins.

The synthesis of aliphatic mercaptans through the direct catalytic addition of hydrogen sulfide to olefinic hydrocarbons of 8 or more carbon atoms is a well established process. Controlled proportions of an olefinic hydrocarbon, or olefinic hydrocarbon mixtures, such as mixtures of dodecylene and higher homologs, and hydrogen sulfide are contracted with an adsorbent silicametal oxide gel-type catalyst under conditions selected to produce a substantial conversion of the olefin or olefins to the corresponding mercaptans. Accompanying the production of mercaptans is the formation of undesirable heavy residual products that are removed from the process.

Accordingly, it is an object of this invention to provide an improved process for the addition of hydrogen sulfide to olefinic hydrocarbons.

Another object of this invention is to provide a process for the manufacture of mercaptans by the direct addition of hydrogen sulfide to olefins containing 8 or more carbon atoms per molecule.

Still another object of this invention is to provide an improved process for the production of mercaptans wherein the formation and subsequent withdrawal of undesirable residual by-products is minimized.

Other objects, advantages, and features of my invention will be readily apparent to those skilled in the art from the following description and appended claims.

The process of this invention comprises recycling a kettle bottoms product, normally removed from a mercaptan producing process, to the catalyst cases with fresh and recycle olefin feed for conversion of the sulfide and disulfide, present in the kettle bottoms product, to mercaptan.

The drawing is a schematic diagram of the inventive process.

Referring to the drawing, the inventive process will be discussed as it applies to the specific embodiment of the manufacture of tertiary dodecyl mercaptan. It is, of course, to be understood that the inventive process can be applied to the manufacture of other mercaptans, preferably wherein the olefinic hydrocarbon feed is comprised of 8 or more carbon atoms per molecule. For purposes of simplification, all figures hereinafter disclosed are based upon 100 pounds per hour of fresh tertiary dodecene olefin feed charged from storage vessel 10 through conduit 11. To this is added 52 pounds of $H_2S$ from storage vessel 12, 67 pounds of recycle olefin, and 2 pounds of heavies hereinafter described, charged through conduits 13, 14 and 15, respectively. The mixture is pressurized to a pressure of 850 p.s.i.g. by means not herein shown, and passed to a catalyst bed in vessel 17 by means of a conduit 16. The catalyst employed is an acid activated clay catalyst, grade 71, sold by Filtrol Corporation of Los Angeles, California. Other silica-metal oxide composition catalysts can be employed. Reference is made to U.S. Patent 2,426,646 for the preparation of suitable catalysts. The catalyst bed top temperature is maintained at approximately 195° F. while the bottom temperature is maintained at approximately 285° F. The effluent is passed from the catalyst bed at the rate of 1.5 volumes of effluent per volume of catalyst per hour.

The effluent is passed by means of a conduit 18 to a high pressure stripper vessel 19. The top temperature and pressure of vessel 19 are maintained at approximately 80° F. and 40 p.s.i.g., respectively. The bottom temperature is maintained at a temperature of approximately 275° F. $H_2S$ is removed from vessel 19 by means of a conduit 20 and recycled to the $H_2S$ storage vessel 12. The mercaptan stream is removed from the bottom of vessel 19 by means of a conduit 21 and passed to a low pressure stripper 22.

The top temperature and pressure of the low pressure stripper vessel 22 is maintained at approximately 120° F. and 0.5 p.s.i.g., respectively. The bottom temperature of vessel 22 is maintained at approximately 235° F. A mercaptan stream is passed from the bottom of vessel 22 by means of conduit 23 to a polymer tower 24. A top temperature and pressure of 120° F. and 18 millimeters absolute, respectively, is maintained at the top of vessel 24. A bottom temperature of approximately 285° F. is maintained in vessel 24. An unreacted olefin stream is recycled by means of a conduit 14 from the top of vessel 24 to conduit 15 wherein it is mixed with a fresh olefin feed as previously described. A mercaptan stream is removed from the bottom of vessel 24 by means of conduit 26 and passed to a mercaptan tower 27.

The top temperature and pressure of vessel 27 is maintained at 120° F. and two millimeters absolute, respectively. The bottom temperature of vessel 27 is maintained at an approximate temperature of 310° F. Tertiary dodecyl mercaptan at the rate of 107 pounds per hour is removed from vessel 27 by means of conduit 28. A kettle bottoms stream containing 2 pounds per hour of unreacted sulfides and disulfides is recycled by means of conduit 15 and conduit 16 to vessel 17.

The advantage of recycling the heavy kettle bottoms from the mercaptan tower is at once apparent. The necessity of disposing of the residual kettle bottoms as waste is eliminated. The normally withdrawn kettle product is thus converted to mercaptan.

EXAMPLE I

In order to determine the effect of recycling the kettle bottoms product by the inventive process on the yield of mercaptan product, two runs were made. In the first run, olefin having properties shown in Table I was premixed with Technical Grade (96.9 weight percent) Matheson hydrogen sulfide at a ratio of 1.51 mols of $H_2S$ per mol of olefin. In the second run, the mercaptan kettle bottoms product, one part by weight and having properties shown in Table I, was added to the olefin (9 parts), and the mixture premixed with Matheson hydrogen sulfide at a ratio of 1.70 mols of $H_2S$ per mol of olefin. For both runs the charges were pressurized to 800 p.s.i.g. with nitrogen gas and passed over a catalyst at an average flow rate of 1.46 volumes of effluent per volume of catalyst per hour for the run with olefin and 1.55 volumes of effluent per volume of catalyst per hour for the run containing mercaptan kettle bottoms product. Filtrol catalyst, grade 71, was used for the mercaptan syntheses runs. The catalyst was activated (dried) for 4 hours at 400–425° F., using a small stream of air to purge the case during activation. Fresh catalyst was used in each of the runs. The temperature of the catalyst bed hot spot ranged from 245–255° F. for the run using no recycle and 245–250° F. for the run with the kettle bottoms recycled. The effluents from the two runs were charged separately to a ¾-inch diameter by 4-feet long, spinning band column for fractionation. The results obtained from the two runs are illustrated in Table II.

Table I

|  | Propylene Tetramer | Mercaptan Kettle Product |
|---|---|---|
| Refractive Index, 20/D | 1.4371 | 1.4855 |
| Specific Gravity | 0.7684 (20/4) | 0.8956 (60/60) |
| Molecular Weight | 164.0 | 363.0 |
| Total Sulfur, Wt. Percent | | 13.7 |
| Mercaptan Sulfur, Wt. Percent | | 1.34 |
| Bromine Number | 115.0 | |
| Distillation, Percent Condensed: | | |
| IBp °F | 345 | 585 |
| 5 °F | 352 | 640 |
| 10 °F | 355 | 657 |
| 20 °F | 357 | 675 |
| 30 °F | 359 | 690 |
| 40 °F | 362 | 700 |
| 50 °F | 365 | 710 |
| 60 °F | 368 | 721 |
| 70 °F | 370 | 733 |
| 80 °F | 375 | 748 |
| 90 °F | 382 | 768 |
| 95 °F | 388 | |
| Dry Point °F | 394 | |
| End Point °F | 407 | |

Table II

|  | Tertiary Dodecyl Mercaptan Properties | |
|---|---|---|
|  | Run 1 | Run 2 |
| Refractive Index, 20/D | 1.4635 | 1.4615 |
| Specific Gravity, 60/60 | 0.8588 | 0.8605 |
| Mercaptan Sulfur, Wt. Percent | 15.55 | 15.42 |
| Total Sulfur, Wt. Percent | 15.3 | 14.95 |
| Tertiary Mercaptan Sulfur, Wt. Percent | 14.22 | 14.85 |
| Mercaptan Purity | 94.6 | 92.2 |
| Molecular Weight | 195.0 | 191.7 |
| Distillation, Percent Condensed: | | |
| IBp °F | 428 | 422 |
| 5 °F | 440 | 439 |
| 10 °F | 445 | 445 |
| 20 °F | 452 | 452 |
| 30 °F | 455 | 455 |
| 40 °F | 460 | 461 |
| 50 °F | 462 | 462 |
| 60 °F | 465 | 466 |
| 70 °F | 468 | 468 |
| 80 °F | 472 | 473 |
| 90 °F | 477 | 478 |
| 95 °F | 483 | 486 |

The same amount of mercaptan kettle product was recovered from the second run as was charged with the olefin feed to the catalyst bed. This shows that there is no additional build-up of heavy material while operating according to the inventive process. Table II clearly illustrates that at least a portion of the normally discarded kettle bottoms product was converted to mercaptan when it is noted that although the yield of mercaptan was only slightly less in run 2, the fresh olefin feed had been reduced by 10 percent as compared to run 1. It should be noted that although for purposes of this example the feed contained 10% kettle bottoms, normally the kettle bottoms will comprise 1 to 3 percent of the feed material. Obviously, no adverse effects are encountered by recycling the mercaptan kettle product.

EXAMPLE II

Figure 2:
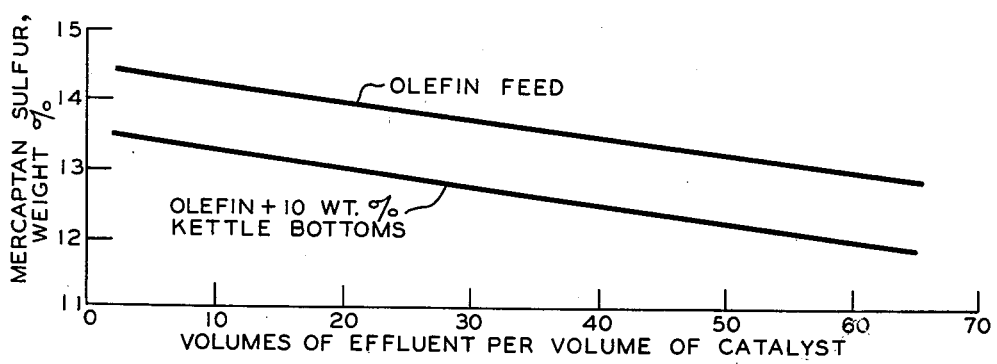

To illustrate the effect of recycling the kettle bottoms product on catalyst life, the charge samples of runs 1 and 2 of Example I were passed through the catalyst bed of Example I, and the results illustrated in FIGURE 2.

FIGURE 2 indicates the change in the mercaptan sulfur content of the effluent from the catalyst bed as the volumes of effluent per volume of catalyst is increased. From FIGURE 2, it may be seen that the slopes of the two curves are almost identical —0.26 for the olefin run versus —0.028 for the run with kettle product. This shows that the presence of the heavies in the feed to the reaction chamber does not harm the life of the catalyst.

The effect on per pass yield may also be seen in FIGURE 2. The conversion was 6.5 to 8.0 weight percent lower in the run using the recycle kettle product. This represents a substantial increase in efficiency produced by the inventive process in that the fresh olefin feed to the catalyst bed has been reduced by 10 percent.

As will be evident to those skilled in the art, various modifications of this invention can be made, or followed, in the light of the foregoing disclosure and discussion, without departing from the spirit or scope thereof.

I claim:

1. In a process for the production of a mercaptan comprising the catalytic reaction of an olefin with hydrogen sulfide in a reaction zone, separating unreacted $H_2S$ from the effluent from said reaction zone in a first separation zone, passing a mercaptan containing stream from said first separation zone to a second separation zone wherein unreacted olefins are separated from said mercaptan containing stream, passing said mercaptan containing stream to a fractionation zone, removing a mercaptan stream from the upper region of said fractionation zone, and withdrawing a bottoms product from said fractionation zone; an improvement consisting of recycling said bottoms product to said reaction zone.

2. The process of claim 1 wherein the olefin charged to the reaction zone contain at least 8 carbon atoms per molecule.

3. The process of claim 2 wherein said first separation zone is comprised of a high pressure zone and a low pressure zone.

4. In a process for the production of tertiary dodecyl mercaptan comprising the catalytic reaction of an olefin containing 8 or more carbon atoms per molecule with hydrogen sulfide in a reaction zone, the ratio of olefins to hydrogen sulfide maintained in the range of 2 to 5 pounds of olefins per pound of hydrogen sulfide, separating unreacted $H_2S$ from the effluent from said reaction zone in a first separation zone, passing a tertiary dodecyl mercaptan containing stream from said first separation zone to a second separation zone wherein unreacted olefins are separated from said tertiary dodecyl mercaptan containing stream, passing said mercaptan containing stream from said second separation zone to a fractionation zone, removing a tertiary dodecyl mercaptan stream from said fractionation zone, and withdrawing a bottoms product stream containing sulfides and disulfides from said fractionation zone; an improvement consisting of recycling said bottoms product stream to said reaction zone.

5. The process of claim 4 wherein said first separation zone is comprised of a high pressure zone and a low pressure zone.

References Cited in the file of this patent

UNITED STATES PATENTS

| 2,211,990 | Shoemaker | Aug. 20, 1940 |
| 2,951,875 | Loev et al. | Sept. 6, 1960 |